Figure 1:
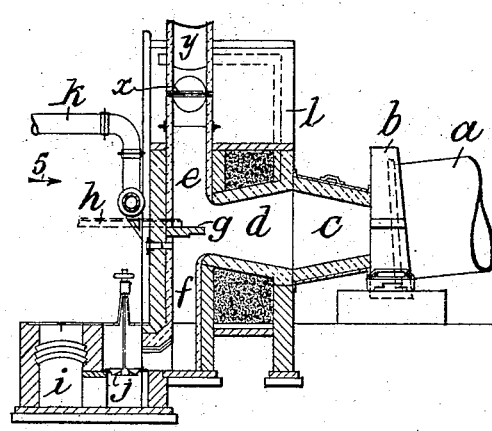

No. 864,045. PATENTED AUG. 20, 1907.
B. H. THWAITE.
METHOD OF BURNING CEMENT IN ROTARY KILNS.
APPLICATION FILED FEB. 2, 1907.

2 SHEETS—SHEET 1.

Witnesses.
D. E. Tomlinson
Jacob Schaefer

Inventor.
Benjamin H. Thwaite
by Herbert W. Jenner.
Attorney.

THE NORRIS PETERS CO., WASHINGTON, D. C.

No. 864,045.
PATENTED AUG. 20, 1907.
B. H. THWAITE.
METHOD OF BURNING CEMENT IN ROTARY KILNS.
APPLICATION FILED FEB. 2, 1907.
2 SHEETS—SHEET 2.
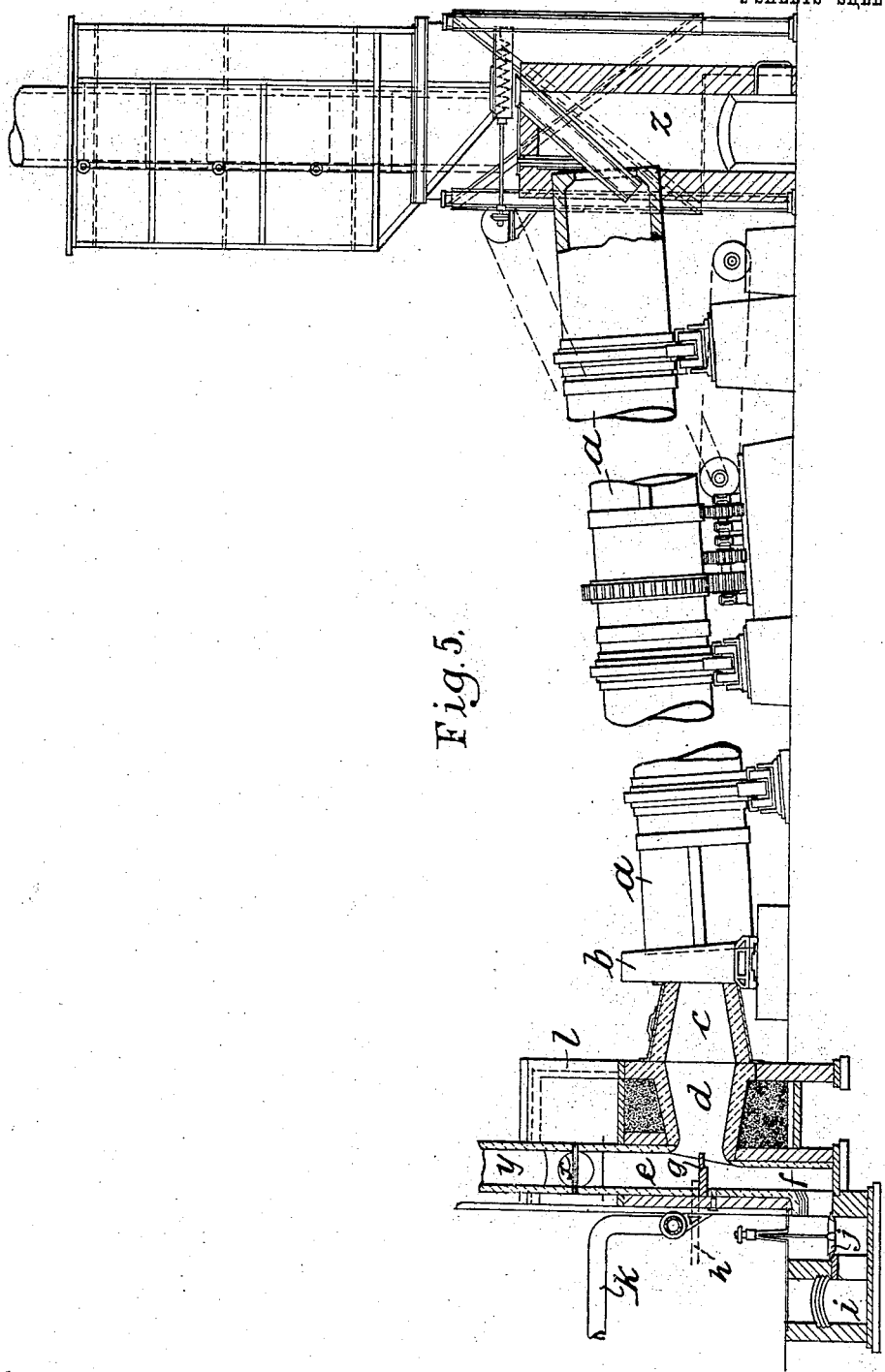

UNITED STATES PATENT OFFICE.

BENJAMIN H. THWAITE, OF LONDON, ENGLAND, ASSIGNOR TO THOS. C. FAWCETT, LIMITED, OF LEEDS, ENGLAND.

METHOD OF BURNING CEMENT IN ROTARY KILNS.

No. 864,045.  Specification of Letters Patent.  Patented Aug. 20, 1907.

Application filed February 2, 1907. Serial No. 355,448.

*To all whom it may concern:*

Be it known that I, BENJAMIN HOWARTH THWAITE, a subject of King Edward VII of Great Britain, and a resident of London, England, have invented certain new and useful Improvements in the Method of Burning or Calcining Calcareous and Argillaceous and Mineral Substances in Rotary Furnaces or Kilns, of which the following description, in connection with the accompanying drawings, is a specification.

This invention relates to improvements in the method of burning or calcining calcareous and argillaceous and mineral substances in rotating furnaces or kilns, and is especially applicable for the production of Portland cement or for purposes where exceptionally high temperatures are necessary and essential to secure uniform and high quality results.

It is well known that producer gaseous fuel has been employed for the above purposes as well as what is known as powdered fuel, but without satisfactory results, the difficulty with the former being in securing such a sustained flame temperature as will clinker the raw materials constituting the cement, while in using powdered fuel the difficulty is the entirely local temperature set up and the impossibility of spreading the flame.

The object of my invention is to overcome these difficulties.

In one method in which, according to my invention, only producer gaseous fuel is employed, I secure a highly intense and lengthened flame temperature in the following manner, constituting an essential feature of my invention. Instead of turning the whole of the gas apportioned to a particular rotary kiln, into such kiln, I only turn or divert thereto the major part of the flow of such gaseous fuel, the remaining portion being diverted into air preheating or recuperator vessels either of the reversible or of the continuous acting type, the effluent gases from which I utilize in any approved manner. I introduce the air to support combustion into these air preheating or recuperator vessels (two of which are required if of the reversible type) and alternately with the gaseous fuel, the air thus highly heated being diverted to the rotary kiln gas and air mixing chamber or chambers, where combustion takes place, the temperature of combustion being thus raised to the degree desired for effectually producing cementitious clinker or for other purposes. I am aware that ordinary air preheating recuperative methods have been employed for this purpose, my own British Patent No. 11412 of 1887 having had this object, but the recuperators were soon made ineffective by the influence of the incursion of the dust into the flues and passages, blocking them and fluxing the brick walls.

In my present invention, only combustible dust is introduced into the preheating chambers or recuperators, the dust being burned off after each reversal.

I may employ a continuous type of air preheating recuperator chamber instead of a reversible one, using refractory lined walls to separate the gaseous flame flow from that of the air.

Figure 3:
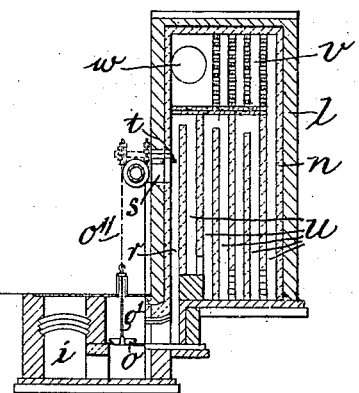
Figure 2:
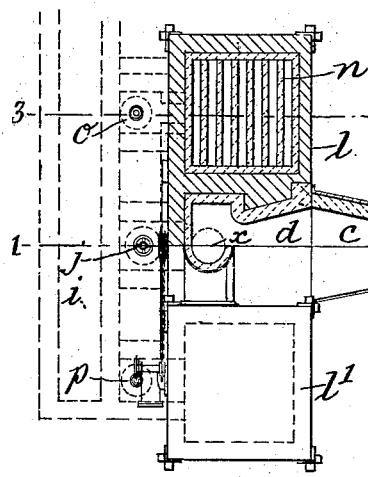
Figure 4:
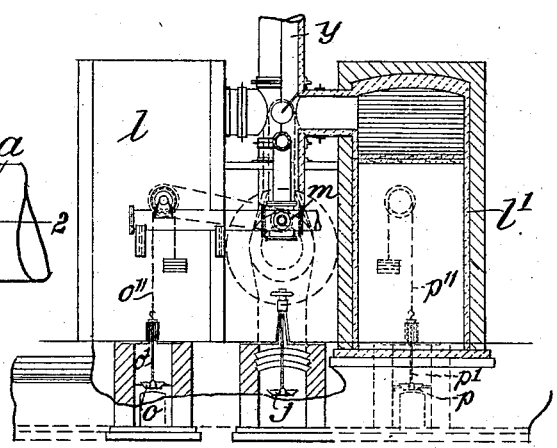

In the accompanying drawings forming a part of this specification:—Figure 1 is vertical longitudinal section of the combustion chamber arrangement, taken as on line 1, 2, of Fig. 2: Fig. 2 is plan view of Fig. 1 partly in section, showing the air recuperator or air preheating chambers with the associated combustion chamber and removable connection to rotary kiln: Fig. 3 is vertical section of the air recuperator or preheating chambers taken on line 3, 4, of Fig. 2: Fig. 4 is part sectional elevation of the two air recuperator or preheating chambers, looking in the direction of arrow 5, Fig. 1, and Fig. 5 is a general longitudinal elevation of the complete rotary kiln showing in section the application of my invention thereto.

Referring to Fig. 1, letter $a$ represents the inclined rotary kiln, the lower end of which has its expansion hood $b$ providing a coupling to the conical shaped flue connection $c$ constituting an extension of the combustion chamber $d$. In the said chamber $d$ the gas and the powdered fuel and hot air meet, commingle and ignite. The preheated air enters the chamber $d$ through the flue $e$ and the gas enters said chamber by means of the flue $f$, the flow of air being diverted by a projecting block $g$ which acts as a lip to the powdered coal injection tongue $h$. The pre-heated air in the flue $e$ and the inflammable producer gas in the flue $f$ are forced together from diametrically opposite directions, or substantially so, and the pulverized fuel is injected crosswise of the streams of air and gas at the point where they meet and impinge against each other. This point is opposite the center of the chambers $d$ and $c$ which lead into the lower end of the kiln $a$, and the cement material is introduced into the upper end of the said kiln. The combustible mixture is ignited after the streams of air, gas and fuel have entered the chambers $c$ and $d$, and the mixture burns with an intense heat inside the kiln $a$ where it meets the cement material. The gas supply is drawn or flows from the main gas flue $i$ which connects the rotary kiln with the gas producer, and such supply is regulated by a valve $j$ which in this instance is of the standard mushroom type. The air supply is drawn or flows under pressure from the air supply main $k$ and alternately is directed into one or two air preheating or recuperator chambers $l$, $l'$, the direction of the air flow being controlled by a reversing valve $m$. The air preheating or recuperator chambers are filled with heat absorbing bricks and walls $n$, somewhat as shown at Figs. 2 and 3. The direction of the flow of the gas supply to the air preheating chambers or recuperators is reversed by means of valves $o$ and $p$ which are moved up and down to open and close same by spindles $o'$, $p'$ and chains $o''$, $p''$, the air flow reversing valve $m$ and the valves $o$ and $p$ each being equipped with sprocket wheels or equivalent gearing and so connected with link chains that the actuation or reversal of one reverses all the others, the usual way being to initially reverse the central air valve.

Fig. 3 shows the flues connecting the main gas flue $i$ with one of the air preheating chambers, the gas flowing through the mushroom reversing valve $o$ upwards through the flue $r$ where it meets the air supply introduced by pipe $s$ at approximately the point marked $t$ where combustion takes place, the resultant flame flowing up and down through the vertical passages $u$ and finally escaping through the superposed chamber $v$, filled with checker brickwork, to the outlet flue $w$ from where the products of combustion of the gaseous fuel pass to the reversal valve $x$ and chimney $y$.

The disposition of the two air preheating chambers $l$, $l'$, is clearly shown at Fig. 4, the centrally located reversing butterfly valve serving to reverse the flow of the waste gases proceeding to the chimney alternately from one and then the other of the two said air preheating chambers. The actuation of this reversing butterfly valve diverts the major part of the air first to one preheating chamber and then to the other, a certain proportion of air always being sent to both chambers to support the combustion of gaseous fuel diverted into same. When the gas supply is cut off to either chamber, the full supply of air is directed into such highly heated chamber and absorbs the heat from the walls and bricks prior to flowing through the butterfly valve into the rotary kiln combustion chamber. While the air is absorbing the heat from one chamber, the gaseous fuel is heating up the other chamber to a point when the reversal of the valve changes the direction of the flow of the gas and a major part of the air. The movement of the air flow reversing valve reverses the butterfly and chimney valve and rotates the sprocket wheels which raise or lower the gas mushroom valves.

I may divert the products of the gaseous combustion from the air preheating chambers, by means of an underground or other flue, to the drying chamber $z$ located at the charging end of the rotary kiln where it meets the heated products of combustion issuing from the outlet of the kiln. Instead of using the air preheating or recuperative methods, I may, as an alternative, introduce powdered fuel into the air and gaseous fuel mixing chamber to a suitable extent to enrich the gas and so as to produce, on combustion, the flame temperature required to effectively clinker the raw agents and produce substantially perfect cement. In some instances, the addition of the powdered fuel applications may be combined with recuperation or preheating of the air in the manner described. I employ by preference a positive or pressure introduction of air into the preheating chambers or recuperators leading to the combustion or mixing chamber, and also prefer to employ forced air supplied in the preheating chambers for raising their temperature.

It will be obvious that the invention is equally available for heating materials below the temperature generally understood by the expression "calcination".

Having fully described my invention, what I claim as new and desire to secure by Letters Patent is:—

1. The process of operating a cement kiln, which consists in forcing together a stream of combustible gas and a stream of pre-heated air from opposite directions, injecting pulverized fuel crosswise of the said streams at the point where they impinge against each other and before they enter the ignition zone of the said kiln, and forcing the cement material into the said ignition zone from the opposite direction from the said mixture to meet the flame.

2. The process of operating a cement kiln, which consists in separating a given volume of combustible producer gas into two streams, utilizing one of the said streams to heat a stream of air, forcing together the said stream of pre-heated air and the remaining stream of gas from opposite directions, injecting pulverized fuel crosswise of the said streams at the point where they impinge against each other and in advance of the point where the mixture is ignited, and forcing the cement material into the said ignition zone from the opposite direction from the said mixture to meet the flame.

3. The process of operating a cement kiln, which consists in forcing together streams of inflammable gas and air from opposite directions, injecting pulverized fuel crosswise of the said streams at the point where they impinge against each other and before they enter the ignition zone, and forcing the cement material into the said ignition zone from the opposite direction from the said mixture to meet the flame.

In testimony whereof I affix my signature in the presence of two witnesses.

BENJAMIN H. THWAITE.

Witnesses:
H. D. JAMESON,
A. NUTTING.